United States Patent
Hamada

(10) Patent No.: US 10,457,215 B2
(45) Date of Patent: Oct. 29, 2019

(54) VEHICLE MIRROR DEVICE

(71) Applicant: KABUSHIKI KAISHA TOKAI-RIKA-DENKI-SEISAKUSHO, Aichi-ken (JP)

(72) Inventor: Takehiro Hamada, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/612,231

(22) Filed: Jun. 2, 2017

(65) Prior Publication Data

US 2017/0355311 A1 Dec. 14, 2017

(30) Foreign Application Priority Data

Jun. 10, 2016 (JP) .................... 2016-116482

(51) Int. Cl.
B60R 1/078 (2006.01)
B60R 1/06 (2006.01)

(52) U.S. Cl.
CPC .............. B60R 1/078 (2013.01); B60R 1/06 (2013.01)

(58) Field of Classification Search
CPC ................... B60R 1/078; B60R 1/06
USPC ....... 359/841, 872, 877, 878, 874, 876, 871, 359/844
See application file for complete search history.

(56) References Cited

U.S. PATENT DOCUMENTS

2001/0030872 A1 10/2001 Sakamoto et al.
2002/0130239 A1* 9/2002 Ishigami ............... B60R 1/06
248/475.1

(Continued)

FOREIGN PATENT DOCUMENTS

| EP | 1243471 A2 | 9/2002 |
|---|---|---|
| JP | S6316944 U | 2/1988 |
| JP | H0381182 U | 8/1991 |

(Continued)

OTHER PUBLICATIONS

Extended European Search Report issued in the corresponding European Application No. 17174670.4 dated Oct. 16, 2017.

(Continued)

*Primary Examiner* — Stephone B Allen
*Assistant Examiner* — Rahman Abdur
(74) *Attorney, Agent, or Firm* — Roberts Mlotkowski Safran Cole & Calderon P.C.

(57) ABSTRACT

A vehicle mirror device including: a support body supported on a vehicle body side; a housing body housing the mirror; a covering body that covers the housing body at a back face side of the mirror; an up-down restricting section that restricts relative movement of the first bottom wall section and the second bottom wall section in the up-down direction; a horizontal displacement restricting section that restricts relative movement of the first bottom wall section and the second bottom wall section in the extension direction of the boundary; and an engagement section that is provided at mutually adjacent sides of the first and second bottom wall sections, such that the first and second bottom walls engage with each other in a state bearing tension in a direction to separate the first bottom wall section and the second bottom wall section from each other in a bottom view.

4 Claims, 5 Drawing Sheets

(56) References Cited

U.S. PATENT DOCUMENTS

2003/0070390 A1 4/2003 Dunn
2012/0119053 A1 5/2012 Sugisaka et al.

FOREIGN PATENT DOCUMENTS

| JP | H0663439 U | 9/1994 |
| JP | 2001-294081 A | 10/2001 |
| JP | 2002-347518 A | 12/2002 |
| JP | 2003-048484 A | 2/2003 |
| JP | 2005053301 A | 3/2005 |
| JP | 2012101699 A | 5/2012 |

OTHER PUBLICATIONS

Office Action issued in corresponding Japanese Patent Application No. 2016-116482 dated Oct. 16, 2018.
Office Action dated Jul. 4, 2018 in European Application No. 17174670.4-132; 5 pages.
Office Action issued in the corresponding Japanese Application No. 2016-116483 dated Apr. 24, 2018.

* cited by examiner

VEHICLE MIRROR DEVICE

CROSS-REFERENCE TO RELATED APPLICATION

This application is based on and claims priority under 35 USC 119 from Japanese Patent Application No. 2016-116482 filed on Jun. 10, 2016, the disclosure of which is incorporated by reference herein.

BACKGROUND

Technical Field

The present disclosure relates a vehicle mirror device.

Related Art

Japanese Patent Application Laid-Open (JP-A) No. 2002-347518 describes an assembly structure of a vehicle mirror device.

In this assembly structure, a pair of anchor tabs of a visor rim side are inserted into and anchored to a first communication section of a mirror frame, and a fitting tab of a visor cover side is disposed between the two tabs of the pair of anchor tabs of the visor rim side. Deformation of the pair of anchor tabs of the visor rim in the opposite direction of an anchoring direction is thereby prevented. Further, an anchor tab on the visor cover side is inserted into and anchored to a second communication section of the mirror frame, and a resilient tab of the visor rim abuts the anchor tab of the visor cover. Deformation of the anchor tab of the visor cover in the opposite direction of the anchoring direction is thereby prevented.

However, in the related art described above, there is room for improvement with regard to stabilizing the relative positions between bottom faces of a visor of the vehicle mirror device, namely, the respective bottom faces of a visor trim (housing body) and the visor cover (covering body).

SUMMARY

In consideration of the above circumstances, the present disclosure provides a vehicle mirror device that enables relative positions between respective bottom faces of a housing body and a covering body to be stabilized.

A vehicle mirror device of a first aspect of the present disclosure includes a support body, a housing body, a covering body, an up-down restricting section, a horizontal displacement restricting section, and an engagement section. The support body is supported on a vehicle body side. The housing body is supported by the support body, configures part of a swing body provided with a mirror and configured to swing with respect to the support body, and houses the mirror in a state in which a mirror surface side of the mirror is exposed. The housing body includes a first bottom wall section provided at a base portion side of the housing body so as to form a gap between the first bottom wall section and the support body. The covering body configures part of the swing body and covers the housing body at a back face side of the mirror. The covering body includes a second bottom wall section provided at a base portion side of the covering body and is disposed side-by-side with the first bottom wall section so as to form a gap between the second bottom wall section and the support body. The up-down restricting section is provided at mutually adjacent sides of the first bottom wall section and the second bottom wall section such that the first bottom wall section and the second bottom wall section abut each other in an up-down direction so as to restrict relative movement of the first bottom wall section and the second bottom wall section in the up-down direction. The horizontal displacement restricting section is provided at mutually adjacent sides of the first bottom wall section and the second bottom wall section such that the first bottom wall section and the second bottom wall section abut each other in an extension direction of a boundary between the first bottom wall section and the second bottom wall section in a bottom view so as to restrict relative movement of the first bottom wall section and the second bottom wall section in the extension direction of the boundary. The engagement section is provided at mutually adjacent sides of the first bottom wall section and the second bottom wall section such that the first bottom wall section and the second bottom wall section engage with each other in a state bearing tension in a direction to separate the first bottom wall section and the second bottom wall section from each other in a bottom view.

According to the vehicle mirror device of the first aspect of the present disclosure, the support body is supported on the vehicle body side, and the swing body is supported by the support body. The mirror is provided to the swing body, and the swing body is configured to swing with respect to the support body. Further, the housing body configuring part of the swing body houses the mirror in a state in which the mirror surface side of the mirror is exposed. The first bottom wall section provided at the base portion side of the housing body is provided so as to form a gap between the first bottom wall section and the support body. Moreover, the covering body configuring part of the swing body covers the housing body at the back face side of the mirror. The second bottom wall section provided at the base portion side of the covering body is disposed side-by-side with the first bottom wall section so as to form a gap between the second bottom wall section and the support body.

The up-down restricting section, horizontal displacement restricting section, and engagement section are provided at the mutually adjacent sides of the first bottom wall section and the second bottom wall section. The up-down restricting section is provided such that the first bottom wall section and the second bottom wall section abut each other in the up-down direction so as to restrict relative movement of the first bottom wall section and the second bottom wall section in the up-down direction. Further, the horizontal displacement restricting section is provided at mutually adjacent sides of the first bottom wall section and the second bottom wall section such that the first bottom wall section and the second bottom wall section abut each other in an extension direction of a boundary between the first bottom wall section and the second bottom wall section in a bottom view so as to restrict relative movement of the first bottom wall section and the second bottom wall section in the extension direction of the boundary. Moreover, the engagement section is provided such that the first bottom wall and the second bottom wall engage with each other in a state bearing tension in the direction to separate the first bottom wall section and the second bottom wall section from each other in a bottom view. Thus, the first bottom wall section and the second bottom wall section are stably restricted from relative movement toward a direction intersecting the extension direction of the boundary.

As described above, the first bottom wall section and the second bottom wall section are restricted from movement in the up-down direction in the extension direction of the boundary between the first bottom wall section and the second bottom wall section in a bottom view, and in the direction intersecting the extension direction of the boundary. The positions of the respective bottom faces of the housing body and the covering body are thereby stabilized.

A vehicle mirror device of a second aspect of the present disclosure is the first aspect, wherein the up-down restricting section includes a first up-down restricting portion that restricts the first bottom wall section from relative movement to a lower side with respect to the second bottom wall section, and a second up-down restricting portion that is provided separated from the first up-down restricting portion in the extension direction of the boundary and that restricts the first bottom wall section from relative movement to the upper side with respect to the second bottom wall section. In the second aspect, the engagement section is set to lie between the first up-down restricting portion and the second up-down restricting portion in the extension direction of the boundary.

According to the vehicle mirror device of the second aspect of the present disclosure, the first up-down restricting portion restricts the first bottom wall section from relative movement to the lower side with respect to the second bottom wall section. Further, the second up-down restricting portion is provided separated from the first up-down restricting portion in the extension direction of the boundary between the first bottom wall section and the second bottom wall section in a bottom view. The second up-down restricting portion restricts the first bottom wall section from relative movement to the upper side with respect to the second bottom wall section. The engagement section is set to lie between the first up-down restricting portion and the second up-down restricting portion in the extension direction of the boundary. The engagement section thereby stably engages in a range in which relative movement of the first bottom wall section and the second bottom wall section is stably restricted in the up-down direction.

A vehicle mirror device of a third aspect of the present disclosure has the configuration of the first or second aspect, wherein the horizontal displacement restricting section includes a first horizontal displacement restricting portion that restricts the first bottom wall section from relative movement in one extension direction of the boundary with respect to the second bottom wall section, and a second horizontal displacement restricting portion that is provided separated from the first horizontal displacement restricting portion in the extension direction of the boundary and that restricts the first bottom wall section from relative movement in another extension direction of the boundary with respect to the second bottom wall section. In the third aspect, the engagement section is set to lie between the first horizontal displacement restricting portion and the second horizontal displacement restricting portion in the extension direction of the boundary.

According to the vehicle mirror device of the third aspect of the present disclosure, the first horizontal displacement restricting portion restricts the first bottom wall section from relative movement in the one extension direction of the boundary between the first bottom wall section and the second bottom wall section in a bottom view with respect to the second bottom wall section. The second horizontal displacement restricting portion is provided separated from the first horizontal displacement restricting portion in the extension direction of the boundary, and restricts the first bottom wall section from relative movement in the another extension direction of the boundary with respect to the second bottom wall section. The engagement section is set to lie between the first horizontal displacement restricting portion and the second horizontal displacement restricting portion in the extension direction of the boundary. The engagement section thereby stably engages in a range in which relative movement of the first bottom wall section and the second bottom wall section is stably restricted in the extension direction of the boundary.

A vehicle mirror device of a fourth aspect of the present disclosure has the configuration of any one of the first to the third aspect, wherein the engagement section include a first engagement portion that is provided to one bottom wall section out of the first bottom wall section or the second bottom wall section and that includes a first engagement catch, and a second engagement portion that is provided at the other bottom wall section out of the first bottom wall section or the second bottom wall section and that includes a second engagement catch configured to engage with the first engagement catch. In the fourth aspect, the horizontal displacement restricting section includes the first engagement portion, and a contact portion that is provided at the other bottom wall section so as to abut the first engagement portion in the extension direction of the boundary.

According to the vehicle mirror device of the fourth aspect of the present disclosure, the first engagement catch of the first engagement portion that is provided to one bottom wall section out of the first bottom wall section or the second bottom wall section, and the second engagement catch of the second engagement portion that is provided at the other bottom wall section out of the first bottom wall section or the second bottom wall section, engage with each other in a state bearing tension in a direction in which the first bottom wall section and the second bottom wall section separate from each other in a bottom view. Further, the contact portion is provided at the other bottom wall section, and the contact portion abuts the first engagement portion in the extension direction of the boundary between the first bottom wall section and the second bottom wall section in a bottom view. Relative displacement between the first bottom wall section and the second bottom wall section is thereby even more effectively suppressed.

As explained above, the vehicle mirror device according to the present disclosure enables relative positions between respective bottom faces of the housing body and the covering body to be stabilized.

BRIEF DESCRIPTION OF THE DRAWINGS

Exemplary embodiments of the present disclosure will be described in detail based on the following figures, wherein.

DETAILED DESCRIPTION

Figure 1:
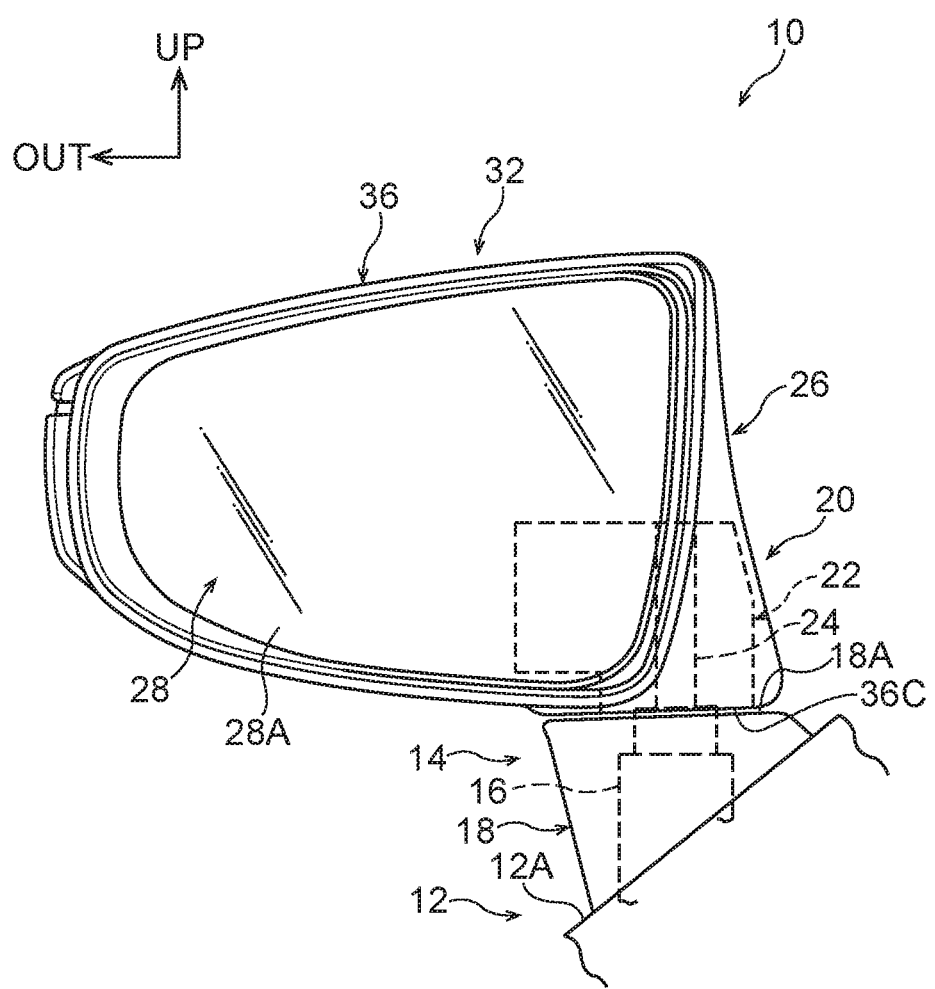
FIG. 1 is a face-on view illustrating a vehicle door mirror device according to an exemplary embodiment of the present disclosure, in a state viewed from the vehicle rear side.

Explanation follows regarding a vehicle door mirror device according to an exemplary embodiment applied with a vehicle mirror device of the present disclosure, with reference to FIG. 1 to FIG. 4C. Note that in the drawings, the arrow FR indicates the vehicle front side, the arrow UP indicates the vehicle upper side, and the arrow OUT indicates the vehicle width direction outside, as appropriate. Further, in the following explanation, reference to the vehicle front-rear direction, the vehicle up-down direction, and the vehicle width direction indicates directions in a state in which a mirror of the vehicle door mirror device is disposed at an in-use position.

FIG. 1 illustrates a vehicle door mirror device 10 according to the present exemplary embodiment in face-on view, in a state viewed from the vehicle rear side. As illustrated in FIG. 1, the vehicle door mirror device 10 according to the present exemplary embodiment is provided on the exterior of a door 12 (vehicle body side) of the vehicle. An outside face of a lower side section of the door 12 is configured by a door panel 12A (door outer panel). An attachment hole (not illustrated in the drawings) is formed penetrating through a vehicle front side end section of an upper end of the door panel 12A.

At a vehicle width direction inside end portion, the vehicle door mirror device 10 includes a support body 14 that is supported by the door 12, this being on the vehicle body side. The support body 14 includes a block-shaped base 16 made of metal (an element understood to be a "support member"). The base 16 is attached to the door 12 through the attachment hole. The vehicle door mirror device 10 is thus attached to and supported by the door 12 of the vehicle body side.

An outer periphery of the base 16 is covered by a base cover 18 configuring the support body 14. The base cover 18 is made of resin, has a substantially circular tube shape, and is open at the lower side. A flat plate shaped upper wall 18A is provided at an upper end of the base cover 18. An exposure hole (not illustrated in the drawings) is formed penetrating a central side portion of the upper wall 18A.

An upper side of the base 16 supports a main body 20, and the main body 20 is provided with a stowing device 22 (retractor), this being a swing section. The stowing device 22 includes a stand 24 (an element understood as a "support section") made of metal and configuring the support body 14. The stand 24 is attached to the base 16 through the exposure hole (not illustrated in the drawings) in the upper wall 18A of the base cover 18. The stowing device 22 is thus attached to and supported by the base 16.

The stand 24 supports a swing body 26, and the swing body 26 is provided with a mirror 28. Further, a housing body 32 configuring part of the swing body 26 houses the mirror 28, in a state exposing a mirror surface 28A side of the mirror 28. The housing body 32 includes a non-illustrated frame (also referred to as a bracket) and a visor rim 36. Namely, part of the mirror 28 on the back face side thereof is fixed to the frame through a mirror surface adjustment device (not illustrated in the drawings), and the visor rim 36 disposed at the vehicle rear side of the frame is fixed to the frame. Note that the swing body 26 has a known internal configuration, for example, that of JP-A No. 2014-19274 or the like, and so detailed explanation thereof is omitted. When the stowing device 22 is driven, the swing body 26 swings about an up-down direction axis with respect to the stand 24.

Figure 2:
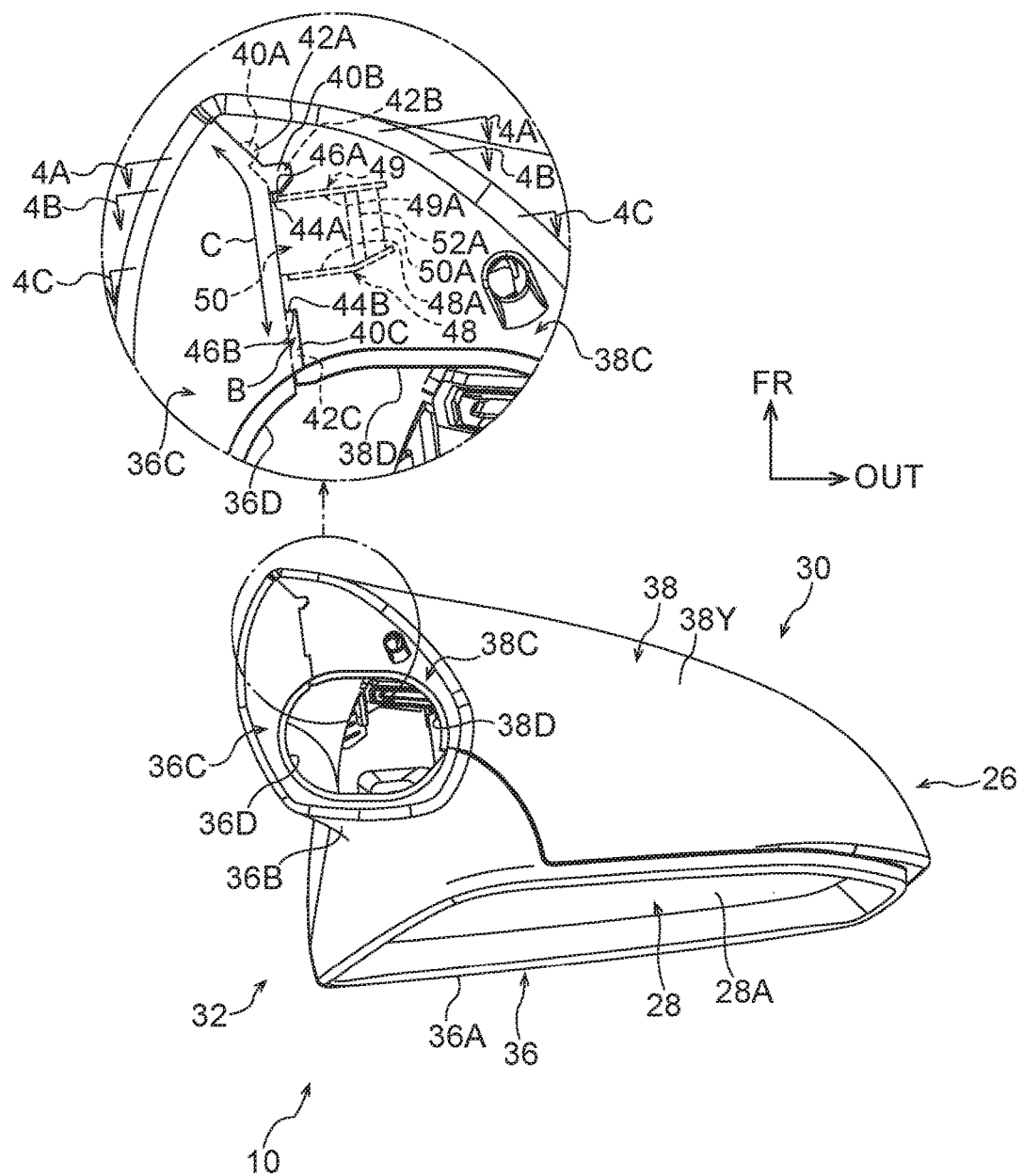
FIG. 2 is a bottom view illustrating a visor of the vehicle door mirror device in FIG. 1, in a state viewed from a bottom face side.

The visor rim 36 is made of resin and configures part of a design section of the vehicle door mirror device 10. FIG. 2 illustrates a bottom view of a visor 30 configured including the visor rim 36, in a state in which the visor 30 is viewed from a bottom face side. The visor rim 36 is formed in a substantially rectangular tube shape and includes a frame shaped section 36A housing the mirror 28. The visor rim 36 includes a first bottom wall section 36C at a lower end (base portion side) of an extension section 36B extending toward a lower side (near side of the page in the drawings) from a lower portion on a vehicle width direction inside of the frame shaped section 36A. A cutout 36D for the stand 24 (see FIG. 1) to pass through is formed in the first bottom wall section 36C. The first bottom wall section 36C faces the upper wall 18A of the base cover 18 illustrated in FIG. 1 in the up-down direction. A gap is formed between the first bottom wall section 36C and the upper wall 18A of the base cover 18.

As illustrated in FIG. 2, a visor cover 38 serving as a covering body and configuring part of the swing body 26 is provided at the vehicle front side of the visor rim 36. At the back face side of the mirror 28, the visor cover 38 covers the housing body 32. The visor cover 38 together with the visor rim 36 configures the visor 30. Note that the visor cover 38 is configured including, for example, a first visor cover 38X (see FIG. 4A to FIG. 4C) configuring an upper section side, and a second visor cover 38Y configuring sections other than the upper section side. The first visor cover 38X (see FIG. 4A to FIG. 4C) and the second visor cover 38Y are joined together. A lower end (base portion side) of the visor cover 38 is provided with a second bottom wall section 38C. A cutout 38D for the stand 24 to pass through is formed in the second bottom wall section 38C. Further, the second bottom wall section 38C faces the upper wall 18A of the base cover 18 illustrated in FIG. 1 in the up-down direction, and a gap is formed between the second bottom wall section 38C and the upper wall 18A of the base cover 18.

As illustrated in FIG. 2, the second bottom wall section 38C is disposed side-by-side with the first bottom wall section 36C. Opposing end faces of the first bottom wall section 36C and the second bottom wall section 38C are basically touching each other. A boundary B between the first bottom wall section 36C and the second bottom wall section 38C in a bottom view extends substantially along the vehicle front-rear direction, and a vehicle front side portion of the boundary B is inclined toward the vehicle width direction inside on progression toward the vehicle front side. Note that in the following explanation, an extension direction of the boundary B between the first bottom wall section 36C and the second bottom wall section 38C in a bottom view is abbreviated simply as "extension direction of the boundary B", and the extension direction of the boundary B denotes both arrow C directions in the drawings.

Figure 3:
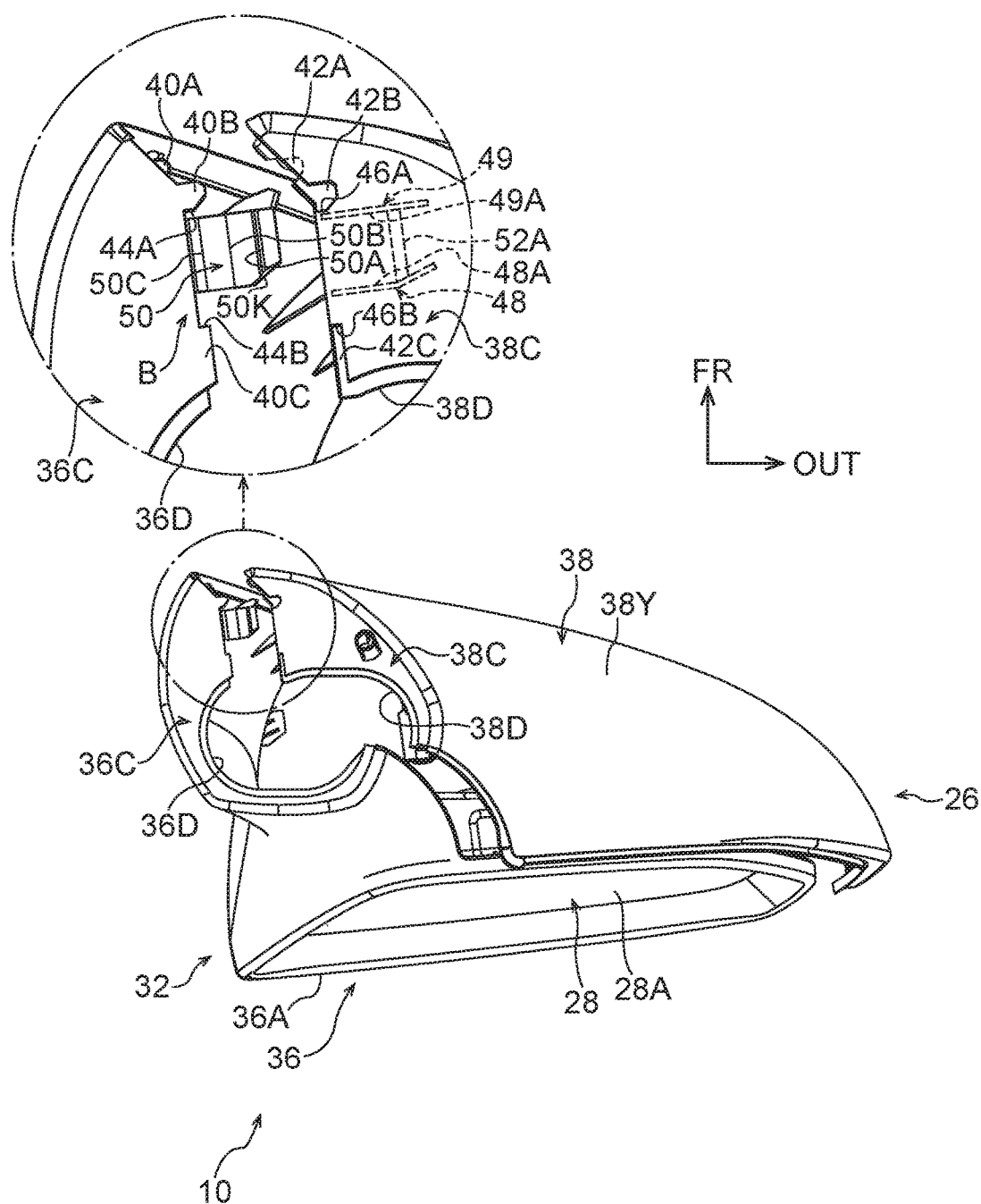
FIG. 3 is an exploded bottom view illustrating the visor rim and a visor cover in a state separated from each other from the state in FIG. 2.

FIG. 3 illustrates an exploded bottom view of a state in which the visor rim 36 and the visor cover 38 have been separated from each other from the state in FIG. 2. Further, FIG. 4A illustrates a cross-section taken along line 4A-4A in FIG. 2, FIG. 4B illustrates a cross-section taken along line 4B-4B in FIG. 2, and FIG. 4C illustrates a cross-section taken along line 4C-4C in FIG. 2.

As illustrated in the enlarged partial view of FIG. 3, a first abutting portion 40A, a second abutting portion 40B, and a third abutting portion 40C, which serve as an up-down restricting section, are formed in this order from the vehicle front side on the first bottom wall section 36C further to the vehicle front side than the cutout 36D of the first bottom wall section 36C and on a side of the first bottom wall section 36C adjacent to the second bottom wall section 38C.

Figure 4A:
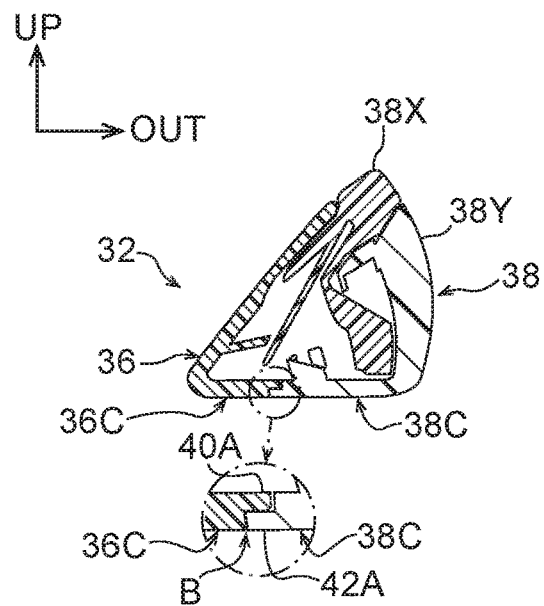
FIG. 4A is a cross-section taken along line 4A-4A in FIG. 2.
Figure 4B:
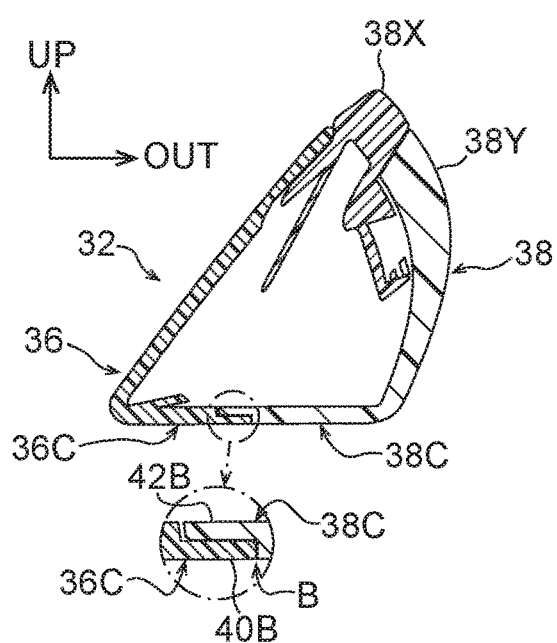
FIG. 4B is a cross-section taken along line 4B-4B in FIG. 2.
Figure 4C:
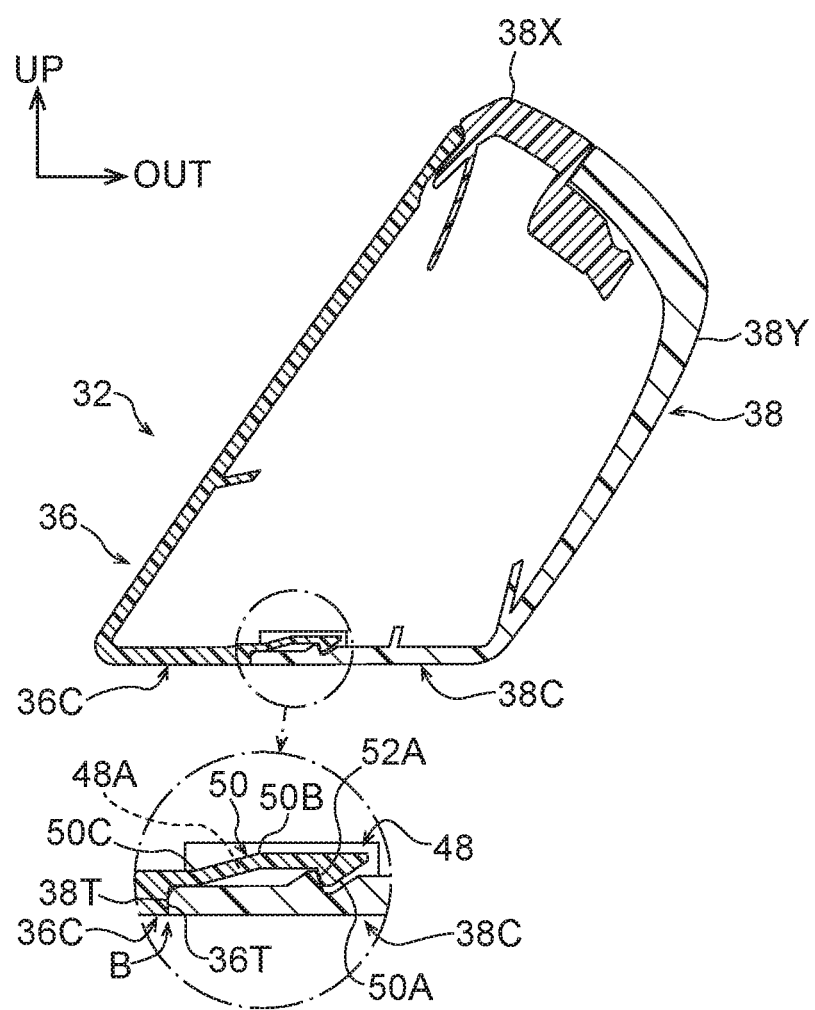
FIG. 4C is a cross-section taken along line 4C-4C in FIG. 2.

The first abutting portion 40A, serving as a first up-down restricting portion, extends from an upper portion of a side end face of the first bottom wall section 36C toward the second bottom wall section 38C side (see FIG. 4A). The second abutting portion 40B and the third abutting portion 40C, serving as a second up-down restricting portion, extend from a lower portion of the side end face of the first bottom wall section 36C toward the second bottom wall section 38C side (for the second abutting portion 40B, see FIG. 4B). The first abutting portion 40A is formed in a tongue shape at the end portion side at the vehicle front side of the first bottom wall section 36C, and the third abutting portion 40C is formed in a substantially rectangular shape in a bottom view, in the vicinity of a vehicle front side of the cutout 36D in the first bottom wall section 36C. Namely, the third abutting portion 40C is provided separated from the first abutting portion 40A in the extension direction of the boundary B. Further, the second abutting portion 40B is formed in a tongue shape in the vicinity of the first abutting portion 40A: between the first abutting portion 40A and the third abutting portion 40C.

Corresponding to these, a first abutted portion 42A, a second abutted portion 42B, and a third abutted portion 42C, serving as an up-down restricting section, are formed in this order from the vehicle front side on the second bottom wall section 38C further to the vehicle front side than the cutout 38D of the second bottom wall section 38C and on a side of the second bottom wall section 38C adjacent to the first bottom wall section 36C.

The first abutted portion 42A serving as a first up-down restricting portion, is a location where an upper face side of the second bottom wall section 38C is recessed so as to be thinner (see FIG. 4A). The second abutted portion 42B and the third abutted portion 42C, serving as a second up-down restricting portion, are locations where a lower face side of the second bottom wall section 38C are recessed so as to be thinner (for the second abutted portion 42B, see FIG. 4B). Further, the first abutted portion 42A is formed on the end portion side at the vehicle front side of the second bottom wall section 38C, and the third abutted portion 42C is formed in the vicinity of the vehicle front side of the cutout 38D in the second bottom wall section 38C. Namely, the third abutted portion 42C is provided separated from the first abutted portion 42A in the extension direction of the boundary B. Further, the second abutted portion 42B is formed in the vicinity of the first abutted portion 42A: between the first abutted portion 42A and the third abutted portion 42C.

As illustrated in FIG. 4A, a lower face of the first abutting portion 40A and an upper face of the first abutted portion 42A abut each other in the up-down direction. The first abutting portion 40A and the first abutted portion 42A accordingly restrict relative movement of the first bottom wall section 36C toward the lower side with respect to the second bottom wall section 38C. Further, as illustrated in FIG. 4B, an upper face of the second abutting portion 40B and a lower face of the second abutted portion 42B abut each other in the up-down direction. Moreover, an upper face of the third abutting portion 40C and a lower face of the third abutted portion 42C illustrated in FIG. 3 abut each other in the up-down direction. Thus, the second abutting portion 40B and the second abutted portion 42B, and the third abutting portion 40C and the third abutted portion 42C restrict the first bottom wall section 36C from relative movement toward the upper side with respect to the second bottom wall section 38C.

As described above, the first abutting portion 40A and the first abutted portion 42A abut each other, the second abutting portion 40B and the second abutted portion 42B abut each other, and the third abutting portion 40C and the third abutted portion 42C abut each other. This restricts relative movement of the first bottom wall section 36C and the second bottom wall section 38C in the up-down direction.

As illustrated in the respective enlarged partial views of FIG. 2 and FIG. 3, a fourth abutting portion 44A and a fifth abutting portion 44B, serving as a horizontal displacement restricting section, are formed on the first bottom wall section 36C further to the vehicle front side than the cutout 36D in the first bottom wall section 36C and on the side of the first bottom wall section 36C adjacent to the second bottom wall section 38C. The fourth abutting portion 44A serving as a first horizontal displacement restricting portion is an end face of the first bottom wall section 36C that is at the vehicle rear side of the second abutting portion 40B. Further, the fifth abutting portion 44B serving as a second horizontal displacement restricting portion is an end face of the first bottom wall section 36C that is at the vehicle front side of the third abutting portion 40C. Namely, the fifth abutting portion 44B is provided separated from the fourth abutting portion 44A in the extension direction of the boundary B.

Corresponding to these, a fourth abutted portion 46A and a fifth abutted portion 46B, serving as a horizontal displacement restricting section, are formed on the second bottom wall section 38C further to the vehicle front side than the cutout 38D in the second bottom wall section 38C and on the side of the second bottom wall section 38C adjacent to the first bottom wall section 36C. As illustrated in FIG. 3, the fourth abutted portion 46A serving as a first horizontal displacement restricting portion configures a step portion between the second abutted portion 42B and the vehicle rear side lower face of the second bottom wall section 38C. The fifth abutted portion 46B serving as the second horizontal displacement restricting portion configures a step portion between the third abutted portion 42C and the vehicle front side lower face of the second bottom wall section 38C. Namely, the fifth abutted portion 46B is provided separated from the fourth abutted portion 46A in the extension direction of the boundary B.

As illustrated in the enlarged partial view in FIG. 2, the fourth abutting portion 44A and the fourth abutted portion 46A abut each other along the extension direction of the boundary B. The fourth abutting portion 44A and the fourth abutted portion 46A thus restrict relative movement of the first bottom wall section 36C toward one extension direction of the boundary B (substantially toward the vehicle rear side) with respect to the second bottom wall section 38C. Further, the fifth abutting portion 44B and the fifth abutted portion 46B abut each other in the extension direction of the boundary B. The fifth abutting portion 44B and the fifth abutted portion 46B thus restrict relative movement of the first bottom wall section 36C toward the other extension direction of the boundary B (substantially the vehicle front side) with respect to the second bottom wall section 38C.

As described above, the fourth abutting portion 44A and the fourth abutted portion 46A abut each other and the fifth abutting portion 44B and the fifth abutted portion 46B also abut each other. The first bottom wall section 36C and the second bottom wall section 38C are thus restricted from moving with respect to each other in the extension direction of the boundary B.

Moreover, as illustrated in FIG. 3, an engagement arm 50, serving as a first engagement portion, is formed on the first bottom wall section 36C further to the vehicle front side than the cutout 36D in the first bottom wall section 36C and on the side of the first bottom wall section 36C adjacent to the second bottom wall section 38C. The engagement arm 50 extends from an upper portion of the side end face of the first bottom wall section 36C toward the vehicle width direction outside and is disposed at the upper face side of the second bottom wall section 38C. The engagement arm 50 configures an engagement section and has a bent plate shape. A first bent portion 50C is formed at a base end side of the engagement arm 50 and a second bent portion 50B is formed at an extension direction intermediate portion of the engagement arm 50. A location from the first bent portion 50C to the second bent portion 50B of the engagement arm 50 is inclined toward the upper side (far side of the page in FIG. 3) on progression along its extension direction in a bottom view. In a pre-assembly state, a location extending from the second bent portion 50B to a leading end portion side of the engagement arm 50 is inclined toward the lower side (near side of the page in FIG. 3) on progression along its extension direction in a bottom view. At the leading end portion side of the engagement arm 50, a first engagement catch 50A is formed protruding toward the lower side (near side of the page in FIG. 3). Further, a cutout 50K is formed diagonally cut out from one side portion (side portion illustrated in the lower side drawing in FIG. 3) of the leading end portion side of the engagement arm 50.

Further, as illustrated in FIG. 4C, a second engagement catch 52A, serving as a second engagement portion at the lower side of the first engagement catch 50A, is formed on the second bottom wall section 38C further to the vehicle front side than the cutout 38D of the second bottom wall section 38C and on the side of the second bottom wall section 38C adjacent to the first bottom wall section 36C. The second engagement catch 52A configures the engagement section and protrudes toward the upper side. The first engagement catch 50A and the second engagement catch 52A engage with each other in a state bearing tension in a direction to separate the first bottom wall section 36C and the second bottom wall section 38C from each other in a bottom view.

To explain further, to engage the first engagement catch 50A with the second engagement catch 52A, the bent plate shaped engagement arm 50 is caused to elastically deform, such that a location extending from the second bent portion 50B toward the leading end portion side of the engagement arm 50 is disposed parallel to the upper face of the second bottom wall section 38C, and the bend angles of the first bent portion 50C and the second bent portion 50B change so as to engage the first engagement catch 50A with the second engagement catch 52A. In a state in which the first engagement catch 50A and the second engagement catch 52A are engaged with each other, an end face 36T of the first bottom wall section 36C and an end face 38T of the second bottom wall section 38C facing each other in the vehicle width direction abut each other in a state of face-to-face contact, and force attempting to return the engagement arm 50 to its original shape acts on the second engagement catch 52A from the first engagement catch 50A.

The engagement arm 50 having the first engagement catch 50A engaged with the second engagement catch 52A is set at an intermediate portion in the extension direction of a boundary B present at the mutually adjacent sides of the first bottom wall section 36C and the second bottom wall section 38C as illustrated in FIG. 2. The engagement arm 50 having the first engagement catch 50A engaged with the second engagement catch 52A is set to lie, in the extension direction of the boundary B, between the third abutting portion 40C/the third abutted portion 42C (see FIG. 3), and the first abutting portion 40A/the first abutted portion 42A and the second abutting portion 40B/the second abutted portion 42B (see FIG. 3). Further, the engagement arm 50 having the first engagement catch 50A engaged with the second engagement catch 52A is set to lie, in the extension direction of the boundary B, between the fourth abutting portion 44A/the fourth abutted portion 46A and the fifth abutting portion 44B/the fifth abutted portion 46B.

Further, as illustrated in FIG. 2 and FIG. 4C, contact portions 48A, 49A, serving as a horizontal displacement restricting section, are formed on the second bottom wall section 38C so as to abut most of respective side faces of the engagement arm 50, in the extension direction of the boundary B (direction perpendicular to the page in FIG. 4C). In other words, the engagement arm 50 also configures part of the horizontal displacement restricting section. The contact portions 48A, 49A are configured by rib shaped protrusions 48, 49 projecting out from the upper face of the second bottom wall section 38C toward the upper side.

As illustrated in FIG. 2, in the present exemplary embodiment, the contact portions 48A, 49A are provided in a pair and abut both respective side faces of the engagement arm 50. The protrusion 49 provided with the contact portion 49A on the vehicle front side, illustrated in FIG. 2, is not illustrated in a state viewed from the vehicle front side. However, as viewed from the vehicle front side, the shape of the protrusion 49 is practically the same as the shape of the protrusions 48 illustrated in FIG. 4C. Further, the cutout 50K of the engagement arm 50 contacts the contact portions 48A when attempting to engage the first engagement catch 50A of the engagement arm 50 illustrated in FIG. 3 with the second engagement catch 52A, such that configuration is made in which the leading end side of the engagement arm 50 is easily guided. Note that as a modified example of the present exemplary embodiment, configuration may be made in which a single contact portion corresponding to either one out of the pair of contact portions 48A, 49A is provided, and this contact portion abuts either one of the side faces of the engagement arm 50.

Explanation follows regarding operation and advantageous effects of the exemplary embodiment above.

In the present exemplary embodiment, the support body 14 is supported by the door 12 illustrated in FIG. 1, this being on the vehicle body side, and the swing body 26 is supported by the support body 14. The mirror 28 is provided to the swing body 26, and the swing body 26 is configured so as to swing with respect to the support body 14. Further, the housing body 32 configuring part of the swing body 26 houses the mirror 28 in a state in which the mirror surface 28A side of the mirror 28 is exposed. A gap is formed between the first bottom wall section 36C provided at the base portion side of the housing body 32 and the upper wall 18A of the base cover 18 of the support body 14. Moreover, the visor cover 38 configuring part of the swing body 26 illustrated in FIG. 2 covers the housing body 32 at the back face side of the mirror 28. The second bottom wall section 38C provided at the base portion side of the visor cover 38 is disposed side-by-side with the first bottom wall section 36C. A gap is formed between the second bottom wall section 38C and the upper wall 18A of the base cover 18 of the support body 14 illustrated in FIG. 1.

The first abutting portion 40A, the second abutting portion 40B, and the third abutting portion 40C, and, respectively corresponding to these, the first abutted portion 42A, the second abutted portion 42B, and the third abutted portion 42C, as illustrated in FIG. 3, FIG. 4A, and FIG. 4B, are respectively provided at the mutually adjacent sides of the first bottom wall section 36C and the second bottom wall section 38C illustrated in FIG. 2. The first abutting portion 40A and the first abutted portion 42A, the second abutting portion 40B and the second abutted portion 42B, and the third abutting portion 40C and the third abutted portion 42C respectively abut each other in the up-down direction so as to restrict relative movement of the first bottom wall section 36C and the second bottom wall section 38C in the up-down direction.

Further, the fourth abutting portion 44A and the fifth abutting portion 44B, and the fourth abutted portion 46A and the fifth abutted portion 46B, as illustrated in FIG. 2 and FIG. 3, are respectively provided at the mutually adjacent sides of the first bottom wall section 36C and the second bottom wall section 38C. The fourth abutting portion 44A and the fourth abutted portion 46A, and the fifth abutting portion 44B and the fifth abutted portion 46B, respectively abut each other in the extension direction of the boundary B so as to restrict relative movement of the first bottom wall section 36C and the second bottom wall section 38C in the extension direction of the boundary B.

Moreover, the engagement arm 50 and the second engagement catch 52A illustrated in FIG. 3 and FIG. 4C are respectively provided at the mutually adjacent sides of the first bottom wall section 36C and the second bottom wall section 38C. The first engagement catch 50A and the second engagement catch 52A of the engagement arm 50 engage with each other in a state bearing tension in a direction to separate the first bottom wall section 36C and the second bottom wall section 38C from each other in a bottom view, such that relative movement of the first bottom wall section 36C and the second bottom wall section 38C is stably restricted in a direction intersecting the extension direction of the boundary B.

As described above, the first bottom wall section 36C and the second bottom wall section 38C are restricted from moving in the up-down direction, in the extension direction of the boundary B, and in the direction intersecting the extension direction of the boundary B. The positions of the respective bottom faces of both the housing body 32 (visor rim 36) and the visor cover 38 are therefore stabilized.

Further, as illustrated in FIG. 4A, in the present exemplary embodiment, the first abutting portion 40A and the first abutted portion 42A restrict relative movement of the first bottom wall section 36C toward the lower side with respect to the second bottom wall section 38C. In the present exemplary embodiment, the second abutting portion 40B and the second abutted portion 42B illustrated in FIG. 3 and FIG. 4B, and the third abutting portion 40C and the third abutted portion 42C restrict relative movement of the first bottom wall section 36C toward the upper side with respect to the second bottom wall section 38C. The engagement arm 50 having the first engagement catch 50A engaged with the second engagement catch 52A, as illustrated in FIG. 2, is set to lie, in the extension direction of the boundary B, between the first abutting portion 40A/the first abutted portion 42A and the third abutting portion 40C/the third abutted portion 42C. Thus, the first engagement catch 50A and the second engagement catch 52A stably engage with each other in a range in which relative movement of the first bottom wall section 36C and the second bottom wall section 38C is stably restricted in the up-down direction (the direction perpendicular to the page in FIG. 2).

Further, in the present exemplary embodiment, the fourth abutting portion 44A and the fourth abutted portion 46A restrict relative movement of the first bottom wall section 36C toward the one extension direction of the boundary B (substantially the vehicle rear side) with respect to the second bottom wall section 38C, and the fifth abutting portion 44B and the fifth abutted portion 46B restrict relative movement of the first bottom wall section 36C toward the other extension direction of the boundary B (substantially the vehicle front side) with respect to the second bottom wall section 38C. The engagement arm 50 having the first engagement catch 50A engaged with the second engagement catch 52A, as illustrated in FIG. 2, is set to lie, in the extension direction of the boundary B, between the fourth abutting portion 44A/the fourth abutted portion 46A and the fifth abutting portion 44B/the fifth abutted portion 46B. Thus, the first engagement catch 50A and the second engagement catch 52A stably engage with each other in a range in which relative movement of the first bottom wall section 36C and the second bottom wall section 38C is stably restricted in the extension direction of the boundary B.

Further, in the present exemplary embodiment, the engagement arm 50 having the first engagement catch 50A engaged with the second engagement catch 52A, is set to lie, at an intermediate portion in the extension direction of the boundary B at the mutually adjacent sides of the first bottom wall section 36C and the second bottom wall section 38C. The boundary B between the first bottom wall section 36C and the second bottom wall section 38C can thereby be stabilized with good balance.

Further, in the present exemplary embodiment, the contact portions 48A, 49A formed on the second bottom wall section 38C illustrated in FIG. 2 abut the engagement arm 50 illustrated in FIG. 4C in the extension direction of the boundary B. Relative displacement between the first bottom wall section 36C and the second bottom wall section 38C is thereby even more effectively suppressed.

As explained above, the vehicle door mirror device 10 according to the present exemplary embodiment enables the positions of the respective bottom faces of both the housing body 32 (visor rim 36) and the visor cover 38 to be stabilized.

Note that in a modified example of the exemplary embodiment described above, configuration may be made in which: an engagement arm (engagement arm including a first engagement catch), serving as a first engagement portion similar to the engagement arm 50 including the first engagement catch 50A illustrated in FIG. 4C, is formed on a second bottom wall section of a visor cover (covering body) such that the engagement arm configures an engagement section; a second engagement catch, serving as a second engagement portion similar to the second engagement catch 52A, is formed on a first bottom wall section of the housing body (visor rim) such that the second engagement catch configures an engagement section; and a contact portion abutting the engagement arm in an extension direction of a boundary between the first bottom wall section and the second bottom wall section in a bottom view is formed on the first bottom wall section.

Further, in the exemplary embodiment described above, the first engagement catch 50A and the second engagement catch 52A of the engagement arm 50 serving as an engagement section engage with each other on the inner face side (upper face side of the bottom wall section) of the visor 30. However, configuration may be made in which the engagement catches engage with each other on the outer face side (lower face side of the bottom wall section) of the visor 30.

Further, in the exemplary embodiment described above, on the sides of the portions of the first bottom wall section 36C and the second bottom wall section 38C illustrated in FIG. 2 that are mutually adjacent to each other, the engagement arm 50 in which the first engagement catch 50A engages with the second engagement catch 52A is set at an intermediate portion in the extension direction of the boundary B. However, a configuration may be adopted such that an engagement section is, for example, set at both end sections or one end section, in the extension direction of the boundary B.

Further, in the exemplary embodiment described above, the engagement arm 50 having the first engagement catch 50A engaged with the second engagement catch 52A is set to lie, in the extension direction of the boundary B, between the first abutting portion 40A/the first abutted portion 42A and the third abutting portion 40C/the third abutted portion 42C. However, a configuration may be adopted in which the engagement arm 50 is not set in this manner.

Further, in the exemplary embodiment described above, the engagement arm 50 having the first engagement catch 50A engaged with the second engagement catch 52A is set to lie, in the extension direction of the boundary B, between the fourth abutting portion 44A/the fourth abutted portion 46A and the fifth abutting portion 44B/the fifth abutted portion 46B. However, a configuration may be adopted in which the engagement arm 50 is not set in this manner.

Further, in the exemplary embodiment described above, the contact portions 48A, 49A each serving as a horizontal displacement restricting section abutting the first engagement catch 50A in the extension direction of the boundary B are formed on the second bottom wall section 38C. However, a configuration may be adopted in which such contact portions are not formed. Further, as a modified example of the exemplary embodiment described above, a configuration may be adopted in which only the engagement arm 50 and the contact portions 48A, 49A are provided serving as a horizontal displacement restricting section, i.e. a configuration in which the fourth abutting portion 44A and the fifth abutting portion 44B of the first bottom wall section 36C, and the fourth abutted portion 46A and the fifth abutted portion 46B of the second bottom wall section 38C are not provided. Further, in the exemplary embodiment described above, the contact portions 48A, 49A serving as a horizontal displacement restricting section abut most of the respective side faces of the engagement arm 50 including the first engagement catch 50A, in the extension direction of the boundary B. However, configuration may be made, for example, in which a protrusion provided with a contact portion serving as a horizontal displacement restricting section abuts only one out of a base end, leading end, or extension direction intermediate portion of the side face of an engagement arm 50, in the extension direction of a boundary B.

Further, in the exemplary embodiment described above, the contact portions 48A, 49A are configured by the protrusions 48, 49. However, a configuration may be adopted in which, for example, a recess for housing an engagement arm 50 is formed in a second bottom wall section 38C, and part of a stepped face linking a bottom face of the recess and an upper face of a general portion (non-recessed portion) is configured as the contact portion abutting the engagement arm 50, in the extension direction of a boundary B.

Further, in the exemplary embodiment described above, the vehicle mirror device of the present disclosure is applied to the vehicle door mirror device 10. However, the vehicle mirror device of the present disclosure may, for example, be applied to another vehicle outer mirror device on the exterior of a vehicle, such as a vehicle fender mirror device, or may be applied to a vehicle inner mirror device in the interior of a vehicle.

Note that combinations of the exemplary embodiment described above and the plural modified examples described above may be implemented as appropriate.

Explanation has been given above regarding an example of the present disclosure. However, the present disclosure is not limited to the above, and obviously various other modifications to the above may be implemented within a range not departing from the spirit of the present disclosure.

What is claimed is:

1. A vehicle mirror device comprising:
a support body that is supported on a vehicle body side;
a housing body that configures part of a swing body, which is supported by the support body, is provided with a mirror, and is configured to swing with respect to the support body, the housing body housing the mirror in a state in which a mirror surface side of the mirror is exposed, and that includes a first bottom wall section having an exterior side and an interior side, the first bottom wall section being provided at a base portion side of the housing body so as to form a gap between the first bottom wall section and the support body;
a covering body that configures part of the swing body, that covers the housing body at a back face side of the mirror, and that includes a second bottom wall section having an exterior side and an interior side, the second bottom wall section being provided at a base portion side of the covering body and disposed side-by-side with the first bottom wall section so as to form a gap between the second bottom wall section and the support body;
up-down restricting sections that are provided at mutually adjacent sides of the first bottom wall section and the second bottom wall section, the up-down restriction sections abutting each other in an up-down direction so as to restrict relative movement of the first bottom wall section and the second bottom wall section in the up-down direction;
horizontal displacement restricting sections that are provided at mutually adjacent sides of the first bottom wall section and the second bottom wall section, the horizontal displacement restricting sections abutting each other along a boundary between the first bottom wall section and the second bottom wall section in a bottom view so as to restrict relative movement of the first bottom wall section and the second bottom wall section along the boundary; and
engagement sections that are provided at mutually adjacent interior sides of the first bottom wall section and the second bottom wall section, the engagement sections interferingly engaging with each other in a state bearing tension in a direction to separate the first bottom wall section and the second bottom wall section from each other in a bottom view, the direction of tension being transverse to the direction of the boundary, and pulling the first bottom wall section and second bottom wall section together at the boundary.

2. The vehicle mirror device of claim 1, wherein:
the up-down restricting section includes a first up-down restricting portion that restricts the first bottom wall section from relative movement to a lower side with respect to the second bottom wall section, and a second up-down restricting portion that is provided separated from the first up-down restricting portion in the extension direction of the boundary and that restricts the first bottom wall section from relative movement to an upper side with respect to the second bottom wall section; and the engagement section is between the first up-down restricting portion and the second up-down restricting portion in the extension direction of the boundary.

3. The vehicle mirror device of claim 1, wherein:

the horizontal displacement restricting section includes: a first horizontal displacement restricting portion that restricts the first bottom wall section from relative movement in one extension direction of the boundary with respect to the second bottom wall section, and a second horizontal displacement restricting portion that is provided separated from the first horizontal displacement restricting portion in the extension direction of the boundary and that restricts the first bottom wall section from relative movement in another extension direction of the boundary with respect to the second bottom wall section; and the engagement section is between the first horizontal displacement restricting portion and the second horizontal displacement restricting portion in the extension direction of the boundary.

4. The vehicle mirror device of claim 1, wherein:

the engagement section includes: a first engagement portion that is provided at one bottom wall section out of the first bottom wall section or the second bottom wall section and that includes a first engagement catch, and a second engagement portion that is provided at the other bottom wall section out of the first bottom wall section or the second bottom wall section and that includes a second engagement catch configured to engage with the first engagement catch; and the horizontal displacement restricting section includes: the first engagement portion, and a contact portion that is provided at the other bottom wall section so as to abut the first engagement portion in the extension direction of the boundary.

\* \* \* \* \*